United States Patent Office 3,551,356
Patented Dec. 29, 1970

3,551,356
TREATMENT OF ZINC OXIDE
Robert S. Bowman, Pittsburgh, Pa., assignor to St. Joseph Lead Company, New York, N.Y., a corporation of New York
No Drawing. Continuation-in-part of applications, Ser. No. 520,376, Jan. 31, 1966, Ser. No. 596,422, Nov. 23, 1966, and Ser. No. 715,194, Mar. 22, 1968. This application Dec. 1, 1969, Ser. No. 881,279
Int. Cl. H01b 1/06
U.S. Cl. 252—518                                              17 Claims

ABSTRACT OF THE DISCLOSURE

The properties of zinc oxide are improved by heating the zinc oxide with halogen compounds at temperatures in the range from about 600° C. to about 950° C. in air or in non-oxidizing or reducing atmospheres. Heating with fluorine compounds is particularly useful in improving the color and/or the conductivity of zinc oxides under various conditions. Stable white sintered zinc oxides and electrically conductive or semiconductive zinc oxides can be produced with various activating halogen compounds and conditions of treatment.

---

This application is a continuation-in-part of application Ser. No. 715,194, filed Mar. 22, 1968 as a continuation-in-part of application Ser. No. 596,422, filed Nov. 23, 1966 as a continuation-in-part of application Ser. No. 520,376 filed Jan. 31, 1966 all three now abandoned.

The invention relates to the preparation of zinc oxide of improved properties and particularly to the preparation of electrically conductive and semi-conductive zinc-oxide, and to the production of zinc oxides of improved whiteness and/or color stability.

I have found that normally non-conductive zinc oxide, French or American process, can be improved in various properties including conductivity, color and stability by treating zinc oxide, in the finely divided form normally produced by commercial processes, with halogen compounds, the properties of the treated product depending on the halogen compound used and on the conditions of treatment.

I have further found that particularly useful zinc oxide products are obtained when zinc oxide is heated with fluoride compounds under selected conditions.

I have found that normally non-conductive zinc oxide, either French or American process, can be converted into an electrically conductive form by subjecting the zinc oxide to the action of a halogen compound of a Group IV element at moderately elevated temperatures in a non-oxidizing atmosphere.

Typical halogen compounds used in this method can be represented by the formula $XMY_3$ wherein M is a group IV element, X is halogen, hydrogen or an organo group such as lower alkyl, and Y is halogen. The non-conductive zinc oxide may be treated with the halogen compound by passing a stream of dry carrier gas, non-reactive with the zinc oxide or the halogen compound at ordinary temperatures, and carrying the halogen compound in admixture therewith, through a body of the zinc oxide in a suitable container at ordinary temperatures until unabsorbed halogen compound appears in the exit gas and thereafter passing a reducing gas, such as hydrogen or carbon monoxide, through the zinc oxide at a temperature in the range from about 40° C. to about 900° C., preferably between about 500° C. and about 800° C. Either the treatment with the halogen compound or the treatment with the reducing gas or both may be effected at rates of flow effective to form a fluidized body of the zinc oxide in the treating chamber. Typical useful carrier gases include dry air, hydrogen, carbon monoxide and nitrogen.

When the halogen compound is an iodine compound of germanium, such as germanium diiodide or germanium tetraiodide the heating may be carried out in either a neutral or a reducing atmosphere.

Alternatively the halogen compound may be introduced into the reducing gas by injection or by passing the gas through a body of the halogen compound maintained at a temperature effective to vaporize the halogen compound at the desired rate and the resulting gaseous mixture passed through a body of zinc oxide at the temperatures defined above.

When the halogen compound is a solid at room temperature, as in the case of titanium tetrafluoride and the germanium iodides the halogen compound may be admixed with the zinc oxide prior to the heating operation.

The amounts of volatile halogen compounds used in the process are below 10 percent by weight of the zinc oxide and typically are in the range from about 0.5 to about 5 percent by weight.

The treated zinc oxide products thus obtained have the fine particle size of the starting material, have low specfiic resistances, and are controllable as to color in that various shades of white, blue-white and tan can be obtained by varying the conditions of treatment and by the uses of various mixtures of the halogen compounds. When the group IV element of the halogen compound used is of higher atomic number than six the treated zinc oxide products are resistant to heat sintering. The fact that the treating agents are contacted with the zinc oxide in the vapor phase is important in obtaining uniformity and thoroughness of surface coverage of the zinc oxide particles.

In the following examples illustrating the principles of the invention, the direct current resistivities of the products are given in ohm-cm. units.

EXAMPLE 1

A normally non-conductive zinc oxide is suspended in a stream of dry air admixed with titanium tetrachloride vapor in a fluidizer unit at ordinary temperature. When titanium tetrachloride vapor appears in the exhaust gases from the fluidizer chamber, the zinc oxide is transferred to a heatable reaction tube and purged of air with a stream of hydrogen. The reaction chamber is then heated to 600° C. while continuing a gentle flow of hydrogen through the chamber for one-half hour. The product, after cooling to room temperature in a hydrogen atmosphere, is blue-white in color and has a resistivity of 90 ohm-cm.

EXAMPLE 2

A non-conductive zinc oxide is treated as in Example 1 except that silicon tetrachloride is substituted for titaniumtetrachloride. The product is white and has a resistivity of $4.5 \times 10^3$ ohm-cm.

EXAMPLE 3

When an equimolar mixture of silicon and titanium tetrachlorides are used in the procedure of Example 1 the product is white with a very faint blue tint and has a resistivity of $2.6 \times 10^2$ ohm-cm.

EXAMPLE 4

When germanium tetrachloride is substituted for titanium tetrachloride in the procedure of Example 1, the product is white with a slight tan tinge and has a resistivity of 1.4 ohm-cm.

EXAMPLE 5

When germanium tetrabromide is substituted for titanium tetrachloride in the procedure of Example 1, added in an amount equivalent to 0.35 weight percent germanium, then heated in hydrogen at 750° C., the product is off-white and has a resistivity of 6.2 ohm-cm.

EXAMPLE 6

When germanium tetraiodide is substituted for germanium tetrabromide, but admixed in powder form with the zinc oxide in an amount equivalent to 0.35 weight percent germanium, then heated in hydrogen at 750° C., the product is off-white and has a resistivity of 2.0 ohm-cm.

Substitution of nitrogen for hydrogen at a processing temperature of 800° C., affords a white product with a resistivity of $4.2 \times 10^2$ ohm-cm.

EXAMPLE 7

When germanium diiodide is substituted for germanium tetraiodide, in an amount equivalent to 0.35 weight percent germanium, then heated in hydrogen as in Example 6, the product is off-white and has a resistivity of 1.6 ohm-cm.

Substitution of nitrogen for hydrogen at a processing temperature of 800° C. affords a white product with a resistivity of $3.5 \times 10^2$ ohm-cm.

EXAMPLE 8

Substitution of titanium tetrafluoride for titaniumtetrachloride in an amount equivalent to 0.30 weight percent titanium in the method of Example 1 processed in hydrogen at 900° C., produces a white product with a resistivity of $4.7 \times 10^4$ ohm-cm.

EXAMPLE 9

When methyltrichlorosilane is used instead of titanium tetrachloride in the procedure of Example 1, the product is white and has a resistivity of $1.9 \times 10^3$ ohm-cm.

EXAMPLE 10

A non-conductive zinc oxide in a heatable reaction chamber is purged of air in a stream of hydrogen at 600° C. Thereafter approximately 2 parts of weight of silicon tetrachloride vapor per 100 parts of zinc oxide is supplied to the stream of hydrogen over a period of about five minutes. The rate of flow of the hydrogen is about one liter per minute for each 100 grams of zinc oxide. The flow of hydrogen is continued for ten minutes after the addition of silicon tetrachloride is discontinued and the zinc oxide is cooled to room temperature in the hydrogen atmosphere. The product is white and has a resistivity of $4.6 \times 10^3$ ohm-cm.

EXAMPLE 11

Methyltrichlorosilane is used in a procedure similar to Example 10, except that this activating agent is introduced into the hydrogen stream by passing the hydrogen through a liquid body of the agent at 0° C. for a period of 15 minutes. The hydrogen flow rate is maintained at about 500 ml. per minute for each 100 grams of zinc oxide. The white product has a resistivity of 7.5 ohm-cm.

EXAMPLE 12

Silicochloroform (trichlorosilane, $HSiCl_3$) used in a procedure similar to that of Example 11, except that the body of the $HSiCl_3$ was maintained at $-10°$ C., produces a white product which has a resistivity of $3.2 \times 10^3$ ohm-cm.

EXAMPLE 13

Chloroform ($HCCl_3$) used at a temperature of $-5°$ C. in a procedure similar to Example 11 produces a white product which has a resistivity of $2.9 \times 10^4$ ohm-cm.

EXAMPLE 14

Carbon tetrachloride ($CCl_4$) in a procedure similar to Example 11 produces a white product which has a resistivity of $1.1 \times 10^4$ ohm-cm.

EXAMPLE 15

Trichloroethylene ($HC_2Cl_3$) in a procedure similar to Example 11 produces a white product which has a resistivity of $7.0 \times 10^3$ ohm-cm.

Particularly useful in the treatment of zinc oxides are inorganic fluorine compounds including hydrofluoric acid, ammonium fluoride, ammonium bifluoride and water-hydrolizable fluorine compounds of the metals of Groups II–B, III, IV, V, VI and VIII of the periodic system (Kirk-Othmer, Encyclopedia of Chemical Technology, 2nd edition, vol 8, 1905, p. 96), such as zinc fluoride, the fluorides of aluminum, gallium and indium, sodium, aluminum fluoride, ammonium hexafluoraluminate, and the silicofluorides sodium, potassium, zinc and aluminum, which in equilibrium with water are at least partially hydrolized with the production of hydrogen fluoride.

Production of white calcined zinc oxide

White, calcined zinc oxides are useful in applications such as fillers, pigments, and extenders where relatively coarse particle size and very good whiteness are desired. Heretofore, the coarse zinc oxides used in these applications, as produced by heat-treatment in air, have been off-color to varying degrees. Sintering of zinc oxide is generally accompanied by some yellowing. I have discovered that the incorporation of the inorganic fluorides described above, at relatively low concentrations, in dry admixture with the zinc oxide prior to heat treatment, prevents yellowing. The products are very white, generally whiter than the original zinc oxide.

The fluorides are unique in this action. All other inorganic additives examined fail to protect the zinc oxide against loss in whiteness.

Fuoride dosages are effective over a wide range. Definite whitening action can be observed with as little as 0.1 atom percent fluorine (i.e., 0.023 wt. percent F). Practical, effective dosage levels are in the 0.3 to 3.6 atom percent range. Dosages as high as 20 atom percent fluorine are not deleterious.

The following is an illustrative example of the production of white calcined zinc oxide:

EXAMPLE 16

95 mg. of pulverized ammonium acid fluoride ($NH_4F-HF$)

are thoroughly dry mixed with 15 g. of French process zinc oxide. The mixture is then heated in a horizontal quartz tube at 800° C. for 20 minutes in a gentle stream of room air, at about 100 cc./min. The product, after cooling to room temperature in air, is graded for whiteness by means of light reflectance measurements. For these evaluations, percent reflectances of green filtered light (G) and of blue filtered light (B) are measured in a reflectance apparatus, using a flat disc of the compressed zinc oxide. The G–B values then relate to degree of yellowness, with the smallest number indicative of the best whiteness. Typical whiteness, or G–B values, are 2.4 for good quality French process zinc oxides, before calcining. Table I below lists a series of zinc oxides processed as in Example 16. The G–B values agree with the relative degree of yellowing as observed by the human eye.

TABLE 1.—EFFECT OF FLUORIDE ON THE WHITENESS OF CALCINED ZINC OXIDES

| | Additive | Atom percent F [1] | G-B (yellowness) |
|---|---|---|---|
| Sample: | | | |
| 1 | None | | 5.6 |
| 2 | $NH_4F$ | 1.8 | 0.5 |
| 3 | $NH_4F\cdot HF$ | 1.8 | 0.5 |
| 4 | $ZnF_2$ | 0.9 | 1.4 |
| 5 | $ZnF_2$ | 1.8 | 0.8 |
| 6 | $ZnF_2$ | 3.6 | 0.9 |

[1] Atoms of F per 100 "molecules" of zinc oxide (ZnO).

Although dry admixtures are preferred because of processing economics, the fluorides can also be applied in water solution or suspension to a water slurry of zinc oxide. The well-stirred slurry is then air dried, for example, at 120° C. The dried product is then pulverized and then heated in air. Calcining temperatures in the 600–900° C. range are effective, and residence times may vary from several minutes to several hours, depending on the degree of coarseness (sintering) desired in the product. Generally, 15–30 minute heating periods at 750–850° C. are preferred.

Although ordinary air is the preferred atmosphere for calcining the fluoride-dosed zinc oxides, relatively neutral gases such as moist nitrogen can be employed. The presence of some moisture is preferred in order to prevent excessive fluoride loses through volatilization from an anhydrous system. The products obtained by calcining in ordinary air, or in moist nitrogen, are non-conductive, i.e., the volume resistivity to direct current is well above $10^5$ ohm-cm.

Production of stable semi-conductive zinc oxide

These products are useful where modest, but stable, electrical conductivity, good whiteness, and relatively small particle size are desirable characteristics. Such applications may include the surface treatment of papers, fibers, and plastics, extenders and fillers in fibers and plastics, as rubber reinforcing agents, as pigments for a variety of paints, and in the fabrication of various semi-conductor devices. Semi-conductivity in powders can be designated by stable volume resistivities in the $10^3$–$10^5$ ohm-cm. region. Materials with stable volume resistivities below $10^3$ ohm-cm. can be regarded as electrical conductors, while those above $10^5$ ohm-cm. are classified as insulators. Stability as used herein refers to the insensitivity of the conductivity to thermal treatment in ordinary air. A conductivity which survives heating in ordinary air at 400° C. for one-half hour is considered to be stable.

The inorganic fluorides as described above, when admixed with zinc oxide, either dry or as water slurries, confer stable semi-conductivity to zinc oxides on heating. The processing requires temperatures in the 600–950° C. range, in a non-oxidizing atmosphere, such as dry nitrogen. The admission of water vapor to the nitrogen stream for a short time, such as five minutes, during the early part of the treating period, is generally beneficial, however. Total time at temperature is normally in the 10–60-minute range, with 20 minutes the preferred time.

The stable conductivity data are given in Table II. The surface resistivities are measured on 0.001″ thick films of −325 mesh zinc oxide-alkyl resin (ratio of zinc oxide to resin solids is 5.9) on non-conductive paper, applied in xylene solution-suspension. The resistivity measurement is determined by the D257–61 ASTM procedure and apparatus after air-drying at room temperature for 12–18 hours. The fluoride-containing semi-conducting zinc oxides are white in color.

The volume resistivity data in ohm-cm. are obtained by compressing 0.7 g. of the sample (powder) in a Plexiglas cylinder between two metal pistols (electrodes) at 1000 lbs. total force at room temperature in ordinary air. The resistance of the resulting wafer, of carefully measured thickness, is then determined with a good quality ohmmeter. The measured ohms resistance is then adjusted to relate to a compressed one cubic centimeter cube of the sample.

Typical examples of the preparation of white, stable, semi-conductive zinc oxides are as follows:

EXAMPLE 17

Pulverized zinc fluoride (172 mg.) is thoroughly dry mixed with 15 g. of no-conductive zinc oixde, to provide 1.8 atom percent or 0.42 weight percent fluorine. The mixture, in a quartz tube, is deaerated in a stream of moist nitrogen for 15 minutes at room temperature, at a flow rate of 100 cc./min. The mixture, in the quartz tube, is then inserted into a horizontal furnace preset at 800° C. The flow of moist nitrogen is continued through the sample for 5 minutes, after which a dry nitrogen stream is used. After an additional 15 minutes of heating, the zinc oxide is withdrawn from the furnace and cooled to room temperature in the stream of dry nitrogen. A small sample of the product is then heated in air at 400° C. for one half hour. After this heat treatment, the volume resistivity is $2.4 \times 10^3$ ohm-cm. The surface resistivity of the −325 mesh product, in a resin matrix as described above, is $1.2 \times 10^9$ ohms.

Zinc oxide dosed with fluoride by a water slurry-solution technique is air dried at 100–120° C., then pulverized and processed as in Example 17. However, the use of moist nitrogen in the deaeration and preliminary heating stages can be deleted. Dry nitrogen is preferred throughout the processing of slurry-mixed mixtures.

EXAMPLE 18

Hydrated aluminum fluoride ($AlF_3 \cdot 3H_2O$, 153 mg.) is thoroughly dry mixed with 15 g. of ordinary non-conductive zinc oxide, to provide 1.8 atom percent, or 0.42 weight percent fluorine. Processing is carried out as in Example 17, except that the calcining temperature is maintained at 700° C. The surface resistivity of the −325 mesh product in a resin matrix is $1.1 \times 10^{10}$ ohms. The product, after heat treatment is 400° C. has a volume resistivity of $7.1 \times 10^4$ ohm-cm.

EXAMPLE 19

To 15 g. of nonconductive zinc oxide are added 26 mg. pulverized gallium oxide, ($Ga_2O_3$) and 95 mg. pulverized ammonium acid fluoride. These dosages correspond to 0.15 atom percent gallium and 1.8 atom percent fluoride. The thoroughly mixed dry mixture is processed as in Example 17 above. The surface resistivity of the white −325 mesh product in a resin matrix is $6.5 \times 10^8$ ohms. The volume resistivity, after heat teratment at 400° C. is $3.0 \times 10^4$ ohm-cm.

TABLE II.—STABLE WHITE SEMI-CONDUCTIVE ZINC OXIDES PROCESSED IN DRY NITROGEN FOR 20 MINUTES AT TEMPERATURE

| Sample | Additive | Mixing | Atom percent F | Processing temp., °C. | Stable volume [1] resistivity, ohm-cm. | Ohms surface resistivity |
|---|---|---|---|---|---|---|
| 1 | None | | | 800 | $10^8$ | |
| 2 | HF | Slurry | 0.3 | 800 | $7.1 \times 10^4$ | |
| 3 | HF | do | 1.8 | 800 | $6.8 \times 10^4$ | |
| 4 | $NH_4F$ | Dry | 1.8 | 800 | $3.4 \times 10^3$ | $1.3 \times 10^9$ |
| 5 | $ZnF_2$ | Dry | 1.8 | [2] 800 | $2.4 \times 10^3$ | $1.2 \times 10^9$ |
| 6 | $AlF_3 \cdot 3H_2O$ | Dry | 1.8 | [2] 800 | $1.5 \times 10^3$ | $9.7 \times 10^8$ |
| 7 | $AlF_3 \cdot 3H_2O$ | Dry | 3.6 | [2] 800 | $6.7 \times 10^3$ | $3.0 \times 10^9$ |
| 8 | $AlF_3 \cdot 3H_2O$ | Dry | 1.8 | [2] 700 | $7.1 \times 10^4$ | |
| 9 | $Ga_2O_3$ plus $NH_4F \cdot HF$ (0.15 atom percent Ga) | Dry | 1.8 | [2] 800 | $3.0 \times 10^4$ | $6.5 \times 10^8$ |
| 10 | $Al(OH)_3$ plus $NH_4F \cdot HF$ (0.15 atom percent Al) | Dry | 1.8 | [2] 800 | $5.1 \times 10^4$ | $2.1 \times 10^9$ |

[1] After heating in air at 400° C. for ½ hour.
[2] Moist nitrogen employed for the first 5 minutes of heating.

Production of stable conductive zinc oxide

These products possess a wider range of stable conductivities, in the $10^1$ to $10^4$ ohm-cm. range. The higher order of conductivity is obtained by processing with the fluoride compounds described above at elevated temperatures in the presence of reducing gases, such as hydrogen or carbon monoxide, or in the presence of zinc or magnesium metal vapors. An inert gas, such as dry nitrogen, is employed as the carrier gas. Mole percent concentrations of the reducing gases or metal vapors in the carrier gas stream are in the 5 to 50 percent range. The products are of relatively small average particle size, in the 0.3–0.5 micron range, and are generally faint blue-white in color.

The family of inorganic fluorides described above can be made to confer stable electrical conductivity to zinc oxides. The processing requires temperatures in the 600–950° C. range, in a reducing atmosphere containing hydrogen or carbon monoxide, or in an atmosphere containing vapors of certain metals, such as zinc or magnesium. Otherwise, the processing is similar to that employed in Examples 17–19 and in Table II.

The use of zinc vapor in the processing atmosphere is preferred for reasons of control, convenience, economy and safety. The partial pressures employed are those which occur as a consequence of heating a body of zinc metal at the processing temperature in a stream of inert gas, such as nitrogen. The zinc partial pressure, under these flow conditions, is generally in the 50–300 torr range. The zinc vapor can be generated from an isolated cell just upstream of the body of zinc oxide, or it can be generated in situ by premixing zinc granules (⅛″ to 1″ size) with the zinc oxide. The excess zinc vapors condense downstream of the zinc oxide.

The data of Table III show that the fluoride ion, when added to zinc oxide, or to a zinc oxide-aluminum hydroxide mixture, confers stabilized conductivity on the zinc oxide. Also, the data show a synergistic action between aluminum and fluorine.

The synergistic interaction of aluminum (or gallium) and fluoride is shown in Table IV where the resulting very high and very stable conductivities are indicated. Another measure of stability is the relatively small increase in volume resistivity between the "as is" and the 400° C. heat-treated products. The aluminum or gallium may be present in the amount of from 0.01 to 10 atoms per 100 molecules of ZnO.

Typical examples for the preparation of stable, electrically conductive zinc oxides follow:

EXAMPLE 20

A mixture composed of 4000 g. non-conductive zinc oxide, 33.5 g. pulverized hydrated aluminum fluoride ($AlF_3 \cdot H_2O$), and 200 g. of ⅛″ zinc particles, contained in a rotating stainless steel drum reactor (18″ long, 12″ diameter), is deaerated with dry nitrogen for several hours at room temperature. A preheated furnace is then lowered over the rotating reactor, and the mass is brought to a temperature of 730° C. The residence time in the 700–730° C. range is one-half hour. A flow of dry nitrogen is maintained at about one liter per minute through the reactor. The furnace is then removed, and the product is cooled to room temperature under a flow of dry nitrogen. The volume resistivity of the product, after screening to remove the metallic particles (31 g.) is 55 ohm-cm. The resistivity of a sample after heating in air at 400° C. for one-half hour is 290 ohm-cm. The dosage of $AlF_3 \cdot H_2O$ provides 0.6 atom percent (0.2 wt. percent) aluminum and 1.8 atom percent fluorine (i.e., 18 atoms of fluorine per 1000 molecules of zinc oxide, ZnO).

EXAMPLE 21

A mixture of 3000 g. non-conductive zinc oxide and 61.2 g. of hydrated aluminum fluoride ($AlF_3 \cdot 3H_2O$) is processed as in Example 20. However, a stainless steel cell, containing 150 g. of metallic zinc and located just upstream of the body of zinc oxide, is employed as an isolated source of zinc vapor. The residence time of the mixture at heat is 20 minutes in the 660–700° C. range. Fifty-seven grams of the zinc were vaporized. The screened product, pale blue-white in color, has a volume resistivity of 86 ohm-cm. After heating in air at 400° C. for one-half hour, the volume resistivity of a sample of the product is 114 ohm-cm.

EXAMPLE 22

A dry mixture composed of 15 g. non-conductive zinc oxide, 22 mg. pulverized hydrated alumina ($Al(OH)_3$), and 95 mg. pulverized ammonium acid fluoride ($NH_4F \cdot HF$)

contained in a quartz reactor tube, is deaerated in a stream of moist nitrogen for 20 minutes at a flow rate of 100 cc. per minute. A graphite cell containing 1.5 g. of metallic zinc is placed just upstream of this mixture prior to deaeration. The reactor tube is then moved into a preheated furnace where the sample is brought quickly to 800° C. and maintained there for five minutes in the flow of moist nitrogen. The gas stream is then changed to dry nitrogen, and the heating at 800° C. in this atmosphere is continued for an additional 15 minutes. The sample, after cooling to room temperature under dry nitrogen, has a volume resistivity of 164 ohm-cm., and a surface resistivity of $1.25 \times 10^8$ ohms. The volume resistivity of a portion of the product heated in air at 400° C. for one-half hour is 114 ohm-cm. The dosages employed provide 0.15 atom percent (0.05 wt. percent) aluminum, and 1.8 atom percent fluorine (0.42 wt. percent). During the entire processing 0.21 g. of zinc is evaporated from the graphite cell.

EXAMPLE 23

A dry mixture composed of 15 g. non-conductive zinc oxide, 26 mg. pulverized gallium oxide ($Ga_2O_3$), and 95 mg. pulverized ammonium acid fluoride ($NH_4 \cdot HF$) is processed as in Example 22. The volume resistivity of the product is 64 ohm-cm., and the surface resistivity is $4.05 \times 10^6$ ohms. The volume resistivity of a portion of the product, after heating in air at 400° C., for one-half hour, 129 ohm-cm. The dosages employed provide 0.15 atom percent gallium (0.13 wt. percent) and 1.8 atom percent fluorine (0.42 wt. percent). During the processing 0.32 g. of zinc is vaporized.

EXAMPLE 24

A dry mixture composed of 15 g. non-conductive zinc oxide and 172 mg. pulversized zinc fluoride ($ZnF_2$) is processed as in Example 22. However, dry nitrogen is employed throughout the entire run. The volume resistivity of the faint blue-white product is $1.0 \times 10^3$ ohm-cm. The volume resistivity of a portion of the product, after heating in air at 400° C. for one-half hour is $3.0 \times 10^3$ ohm-cm. The dosage employed provides 1.8 atom percent fluorine (0.42 wt. percent). During the processing 0.36 g. of zinc is vaporized.

EXAMPLE 25

To 20 ml. of water, containing 418 mg. dissolved aluminum nitrate ($Al(NO_3)_3 \cdot 9H_2O$), and 70 mg. of 48 percent hydrofluoric acid were added 15 g. of non-conductive zinc oxide. The well-stirred slurry was evaporated to dryness in air at 120° C., then pulverized, and processed as in Example 24. The volume resistivity of the product is 190 ohm-cm. The volume resistivity of a portion of the product, after heating in air at 400° C. for one-half hour is, $1.8 \times 10^3$ ohm-cm. The dosages employed provide 0.6 atom percent aluminum (0.2 wt. percent) and 0.9 atom percent fluorine (0.21 wt. percent). During the processing 0.48 g. of zinc is vaporized.

EXAMPLE 26

A 15 g. sample of nonconductive zinc oxide is slurried in 20 ml. water containing 2.3 mg. dissolved 48% hydrofluoric acid. The well-stirred slurry is evaporated to dryness at 170° C. in air. This product is pulverized, then mixed with 418 mg. of pulverized aluminum nitrate $(Al(NO_3)_3 \cdot 9H_2O)$ The mixture is then processed as in Example 24. The volume resistivity of the product is 433 ohm-cm. The volume resistivity of a portion of the product, after heating in air at 400° C. for one-half hour, is $4.3 \times 10^3$ ohm-cm. The dosages employed provide 0.6 percent aluminum (0.2 wt. percent) and 0.3 atom percent fluorine (0.16 wt. percent). During the processing 0.38 g. of zinc is vaporized.

EXAMPLE 27

To 20 ml. of water containing 70 mg. of 48 percent aqueous hydrofluoric acid are added 15 g. of nonconductive zinc oxide. The well-stirred slurry is then air-dried at 120° C. to a dry powder. This powder, in a quartz reactor tube, is deaerated in a stream of nitrogen at room temperature. A graphite cell, containing 1.5 g. of zinc metal is placed just upstream of the body of fluoride-containing zinc oxide. The reactor tube is then moved into a preheated furnace where the sample is brought to 800° C. in the stream of nitrogen flowing at about 100 cc./minute. After heating in this nitrogen-zinc vapor stream for 15 minutes, the product is cooled in the nitrogen stream. The volume resistivity of the faint blue-white product is $3.3 \times 10^3$ ohm/cm. After heating in air at 400° C. for 30 minutes, the product has a volume resistivity of $8.9 \times 10^3$ ohm/cm. The fluoride dosage is 0.9 atom percent fluorine (equivalent to 0.21 wt. percent F.). During the processing, 0.49 g. of zinc is vaporized.

I claim:
1. A method of making electrically conductive zinc oxide which comprises heating zinc oxide with a halogen compound of silicon, carbon, titanium or germanium at a temperature in the range from about 400° C. to about 900° C. is a non-oxidizing atmosphere.
2. A method as defined in claim 1 wherein the heating is effected in a reducing atmosphere.
3. A method as defined in claim 2 wherein the reducing atmosphere is hydrogen.
4. A method as defined in claim 1 wherein the halogen compound is a compound of the formula $XMY_3$ wherein M is silicon, carbon, titanium or germanium, X is chlorine, bromine, iodine, hydrogen or an organo group and Y is chlorine, bromine or iodine.
5. A method of making white calcined zinc oxide which comprises heating zinc oxide at a temperature of from about 600° C. to about 900° C. with an inorganic fluorine compound of the group consisting of hydrogen fluoride, ammonium fluoride, ammonium acid fluoride and water-hydrolizable metal fluorine compounds.
6. A method as defined in claim 5 wherein the heating is carried out in a stream of air, or in moist nitrogen.
7. A method as defined in claim 5 wherein the fluorine compound is present in the amount of from about 0.1 to about 20 atom percent of fluorine.
8. A method of making semi-conductive zinc oxide which comprises heating zinc oxide at a temperature of

TABLE III.—THE EFFECT OF FLUORIDE ON THE STABILITY OF CONDUCTIVE ZINC OXIDES PROCESSED IN NITROGEN-ZINC VAPOR FOR 20 MINUTES AT TEMPERATURE

| Sample: | Additive(s) | Atom percent M | Atom percent halogen | Mixing | Processing temp., °C. | Ohm-cm., Volume resistivity | |
|---|---|---|---|---|---|---|---|
| | | | | | | Before heat treatment at 400° C. | After heat treatment at 400° C. |
| 1 | $Al(NO_3)_3$+HF | 0.6 | 0.18 | Slurry | 800 | $1.1 \times 10^2$ | $2.3 \times 10^4$ |
| 2 | Same as above | 0.6 | 0.45 | do | 800 | $1.1 \times 10^2$ | $2.5 \times 10^3$ |
| 3 | do | 0.6 | 0.9 | do | 800 | $1.9 \times 10^2$ | $1.8 \times 10^3$ |
| 4 | do | 0.6 | 1.8 | do | 800 | $1.4 \times 10^2$ | $1.2 \times 10^3$ |
| 5 | do | 0.6 | 3.6 | do | 800 | $1.4 \times 10^2$ | $1.1 \times 10^3$ |
| 6 | HF | | 0.9 | do | 800 | $3.3 \times 10^3$ | $8.9 \times 10^3$ |
| 7 | HF | | 1.8 | do | 850 | $7.3 \times 10^2$ | $1.3 \times 10^4$ |
| 8 | $ZnF_2$ | 0.9 | 1.8 | Dry | 800 | $1.0 \times 10^3$ | $3.0 \times 10^3$ |
| 9 | $ZnF_2$ | 0.4 | 1.8 | Slurry | 850 | $3.1 \times 10^2$ | $1.0 \times 10^3$ |
| 10 | $Al(OH)_3$ plus $NH_4F.NF$ | 1.2 | 3.6 | Dry | 800 | 50 | $3.8 \times 10^2$ |
| 11 | Same as above | 0.6 | 1.8 | Dry | 800 | $1.4 \times 10^2$ | $7.9 \times 10^2$ |
| 12 | $NH_4F.HF$ | | 1.8 | Dry | 800 | $2.0 \times 10^3$ | $3.0 \times 10^4$ |
| 13 | $Al(OH)_3$ plus $ZnF_2$ | 0.6 | 1.8 | Dry | 800 | 60 | $8.7 \times 10^6$ |
| 14 | $Al(OH)_3$ plus $(NH_4)_2SiF_6$ | 0.6 | 5.4 | Dry | 800 | $1.3 \times 10^2$ | $3.3 \times 10^3$ |
| 15 | $(NH_4)_2SiF_4$ | 0.6 | 5.4 | Dry | 800 | $1.8 \times 10^3$ | $7.1 \times 10^4$ |
| 16 | $Al(OH)_3$ plus $SnF_2$ | 0.6 | 1.8 | Dry | 800 | 9 | $6.0 \times 10^3$ |
| 17 | $Al(OH)_3$ plus $Na_2SiF_6$ | 0.6 | 5.4 | Dry | 800 | $3.0 \times 10^3$ | $8.1 \times 10^4$ |
| 18 | $Al(OH)_3$ plus $SiF_4$* | 0.6 | | Dry | 800 | $3.6 \times 10^2$ | $2.3 \times 10^3$ |
| 19 | $SiF_4$* | | | Dry (vapor) | 800 | $1.4 \times 10^2$ | $6.7 \times 10^3$ |
| 20 | $Al(OH)_3$ plus $NH_4PF_6$ | 0.6 | 1.8 | Dry | 800 | $4.8 \times 10^2$ | $5.0 \times 10^3$ |
| 21 | $Al(OH)_3$ plus $(NH_4)_2TiF_6$ | 0.6 | 5.4 | Dry | 800 | $2.1 \times 10^2$ | $5.3 \times 10^3$ |
| 22 | $Zn(SiF_6)_2$ | 0.9 | 10.8 | Dry | 8.0 | $1.1 \times 10^3$ | $3.v \times 10^4$ |
| 23 | Aluminum silico-fluoride | 0.6 | 1.8 | Dry | 800 | $4.0 \times 10^2$ | $7.5 \times 10^2$ |

*Added as gaseous $SiF_4$ to the zinc oxide, and to the zinc oxide-aluminum hydroxide mixture before processing.

TABLE IV.—STABLE, HIGHLY CONDUCTIVE ZINC OXIDES BY HEATING WITH FLUORIDES OF ALUMINUM AND GALLIUM IN NITROGEN-ZINC VAPOR

| Sample | Activator(s) | Atom percent M | Atom percent F | Mixing | Temp., °C. | Ohm-cm., volume resistivity | | Surface resistivity, ohms |
|---|---|---|---|---|---|---|---|---|
| | | | | | | As is | After heating at 400° C. | |
| 1 | | | | | 700 | $2.9 \times 10^5$ | $2.3 \; 10^8$ | |
| 2 | | | | | 800 | $4.2 \gamma 10_8$ | $3.5 \; 10^8$ | |
| 3 | $Ga_2O_3$ plus $NH_4F \cdot HF$ | 0.15 | 1.8 | Dry | 800 | 64 | 129 | $4.05 \times 10^7$ |
| 4 | $Al(OH)_3$ plus $NH_4F \cdot HF$ | 0.15 | 1.8 | Dry | 800 | 164 | 114 | $1.25 \times 10^8$ |
| 5 | $AlF_3 \cdot 3H_2O$ | 1.2 | 3.6 | Dry | 700 | 293 | 457 | $4.83 \times 10^8$ |
| 6 | Same as above | 4.8 | 13.8 | Dry | 700 | 557 | 614 | |
| 7 | do | 0.6 | 1.8 | Dry | 700 | 386 | 657 | |
| 8 | do | 0.6 | 1.8 | Dry | 750 | 428 | 352 | |
| 9 | do | 0.6 | 1.8 | Dry | 800 | 128 | 171 | |
| 10 | do | 0.15 | 0.45 | Dry | 800 | 786 | 643 | |
| 11 | do | 0.3 | 0.9 | Dry | 800 | 46 | 86 | |
| 12 | do | 0.3 | 0.9 | Dry | 750 | 214 | 243 | |
| 13 | do | 0.3 | 0.9 | Dry | 700 | 514 | 986 | |
| 14 | Al silicofluoride (hydrated $AlF_3$ plus $SiO_2$) | 0.6 | 1.8 | Dry | 650-700 | 144 | 164 | $1.23 \times 10^8$ |
| 15 | $AlF_3 \cdot 3H_2O$ | 1.2 | 3.6 | Dry | *650-700 | 56 | 143 | $1.90 \times 10^8$ |
| 16 | $AlF_3 \cdot 3_2O$ | 1.2 | 3.6 | Dry | *650-700 | 86 | 114 | $1.48 \times 10^7$ |
| 17 | $AlF_3 \cdot 3H_2O$ plus $ZnSiF_6 \cdot 6H_2O$ | 0.15 | 4.05 | Dry | 800 | 93 | 173 | |
| 18 | $AlF_3 \cdot 3H_2O$ plus $ZnF_2$ | 0.15 | 1.65 | Dry | 800 | 27 | 79 | |
| 19 | Same as above | 0.15 | 0.95 | Dry | 800 | 37 | 300 | |
| 20 | $AlF_3$ (anhydrous) | 0.6 | 1.8 | Dry | *850 | 49 | 550 | |

*Zinc vapor derived from zinc particles added to the zinc oxide.

from about 600° C. to about 950° C. in a non-oxidizing atmosphere with an inorganic fluorine compound of the group consisting of hydrogen fluoride, ammonium fluoride, ammonium acid fluoride and water-hydrolizable metal fluorine compounds.

9. A method as defined in claim 8 wherein the non-oxidizing atmosphere is provided by a stream of nitrogen.

10. A method as defined in claim 9 wherein the stream of nitrogen contains water vapor during the inital period of the heating.

11. A method as defined in claim 8 wherein the fluorine compound is present in the amount of from about 0.1 to about 20 atom percent of fluorine.

12. A method of making conductive zinc oxide which comprises heating zinc oxide at a temperature of from about 600° C. to about 950° C. in a reducing atmosphere in the presence of an inorganic fluorine compound of the group consisting of hydrogen fluoride, ammonium fluoride, ammonium acid fluoride and water-hydrolizable metal fluoride compounds.

13. A method as defined in claim 12 wherein the fluorine compound is present in the amount of from about 0.1 to about 20 atom percent of fluorine.

14. A method as defined in claim 12 wherein the reducing atmosphere includes hydrogen.

15. A method as defined in claim 12 wherein the reducing atmosphere includes carbon monoxide.

16. A method as defined in claim 12 wherein the reducing atmosphere includes zinc.

17. A method as defined in claim 12 wherein from about 0.01 to about 10 atom percent of aluminum or gallium are present in the zinc oxide.

References Cited

UNITED STATES PATENTS 3,089,856　5/1963　Cyr et al. _____ 252—518
3,155,504　11/1964　Damm et al. _____ 106—296X DOUGLAS J. DRUMMOND, Primary Examiner U.S. Cl. X.R.

23—147; 106—296; 252—520